United States Patent [19]
Klemka

[11] Patent Number: 5,162,824
[45] Date of Patent: Nov. 10, 1992

[54] ADJUSTABLE LENS SPECTACLE APPARATUS

[76] Inventor: Ronald A. Klemka, 272 Pinecone Ct., Bath, Pa. 18014

[21] Appl. No.: 760,378

[22] Filed: Sep. 16, 1991

[51] Int. Cl.⁵ .............................................. G02C 1/00
[52] U.S. Cl. ...................................... 351/158; 351/41
[58] Field of Search ................... 351/41, 57, 58, 158; 359/481

[56] References Cited

U.S. PATENT DOCUMENTS 4,865,438 9/1989 Wada .................................. 351/158

*Primary Examiner*—Rodney B. Bovernick
*Attorney, Agent, or Firm*—Leon Gilden

[57] ABSTRACT

A spectacle lens structure includes a support frame mounting a rear slidable lens frame relative to a forward fixed lens frame, wherein the rear frame includes respective right and left temple legs, wherein each temple leg includes a drive motor rotatably mounting a drive screw to effect relative displacement of the rear lens frame relative to the forward lens frame to alter magnification of the spectacle structure in use. Additionally, a modification of the invention includes clamp structure mounted to the forward lens frame to effect distortion of the forward lens frame and the associated lenses to thereby alter magnification of the forward lens members mounted within the forward lens frame.

7 Claims, 5 Drawing Sheets

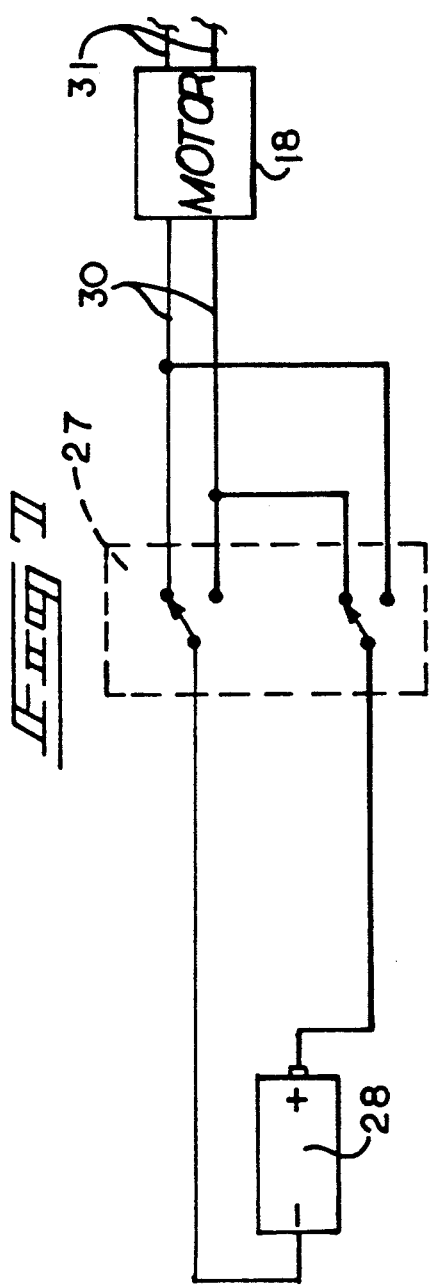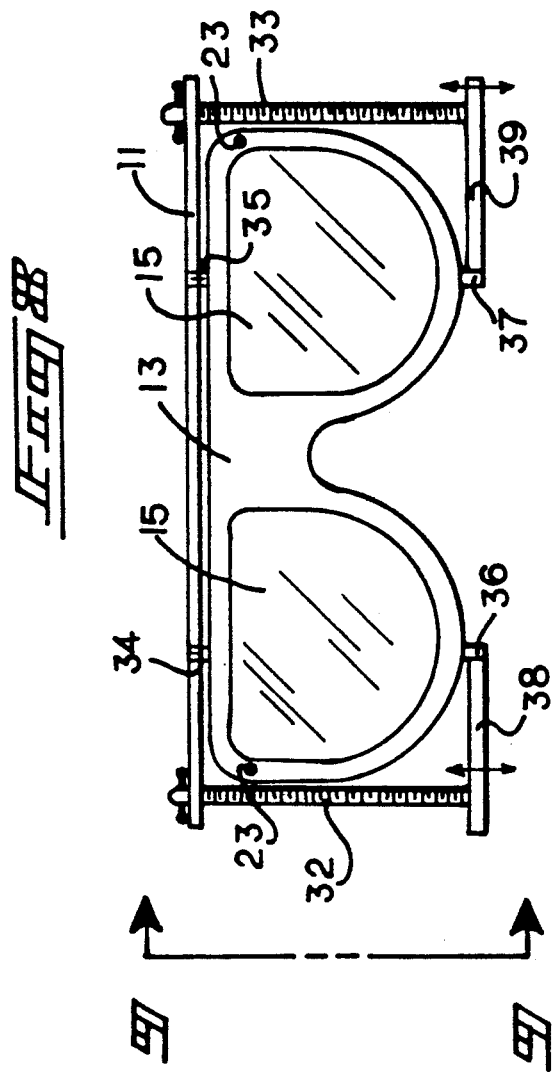

ADJUSTABLE LENS SPECTACLE APPARATUS

BACKGROUND OF THE INVENTION

1. Field of the Invention

The field of invention relates to spectacle apparatus, and more particularly pertains to a new and improved adjustable lens spectacle apparatus wherein the same is arranged to alter magnification of a spectacle pair.

2. Description of the Prior Art

Magnification structure in association with spectacle apparatus has been utilized in the prior art to provide for enhanced magnification in the viewing of various objects. The instant invention attempts to overcome deficiencies of the prior art by providing a unitary organization wherein the rear and forward lens frames contained by the structure are relatively adjustable to alter magnification to provide for adjustable magnification in use. Prior art structure is exemplified in U.S. Pat. No. 3,449,043 to Houston wherein a spectacle structure utilizes a monocular lens mounted rearwardly of one of a plurality of lens members within a spectacle structure.

U.S. Pat. No. 4,195,918 to Freche, et al. sets forth a spectacle pair utilizing rotatable lens structure mounted to a forward surface of each spectacle lens to effect varying magnification in use.

U.S. Pat. No. 3,522,983 to Daniels sets forth a magnification lens mounted fixedly to a spectacle lens structure.

And similarly, the U.S. Pat. No. 3,456,327 to Keeler sets forth a manner of mounting magnification structure relative to a forward magnification lens.

As such, it may be appreciated that there continues to be a need for a new and improved adjustable lens spectacle apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of spectacle apparatus now present in the prior art, the present invention provides an adjustable lens spectacle apparatus wherein the same utilizes a rear lens frame adjustably spaced relative to a forward lens frame to alter magnification between the forward lens pairs in use. As such, the general purpose of the present invention, which will be described subsequently in greater detail, is to provide a new and improved adjustable lens spectacle apparatus which has all the advantages of the prior art spectacle apparatus and none of the disadvantages.

To attain this, the present invention provides a spectacle lens structure including a support frame mounting a rear slidable lens frame relative to a forward fixed lens frame, wherein the rear frame includes respective right and left temple legs, wherein each temple leg includes a drive motor rotatably mounting a drive screw to effect relative displacement of the rear lens frame relative to the forward lens frame to alter magnification of the spectacle structure in use. Additionally, a modification of the invention includes clamp structure mounted to the forward lens frame to effect distortion of the forward lens frame and the associated lenses to thereby alter magnification of the forward lens members mounted within the forward lens frame.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved adjustable lens spectacle apparatus which has all the advantages of the prior art spectacle apparatus and none of the disadvantages.

It is another object of the present invention to provide a new and improved adjustable lens spectacle apparatus which may be easily and efficiently manufactured and marketed.

It is a further object of the present invention to provide a new and improved adjustable lens spectacle apparatus which is of a durable and reliable construction.

An even further object of the present invention is to provide a new and improved adjustable lens spectacle apparatus which is susceptible of a low cost of manufacture with regard to both materials and labor, and which accordingly is then susceptible of low prices of sale to the consuming public, thereby making such adjustable lens spectacle apparatus economically available to the buying public.

Still yet another object of the present invention is to provide a new and improved adjustable lens spectacle apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a diagrammatic illustration of electrical circuitry utilized by the invention.

FIG. 8 is an orthographic front view of a modified front lens frame member utilized by the invention.

DESCRIPTION OF THE PREFERRED EMBODIMENT

Figure 1:
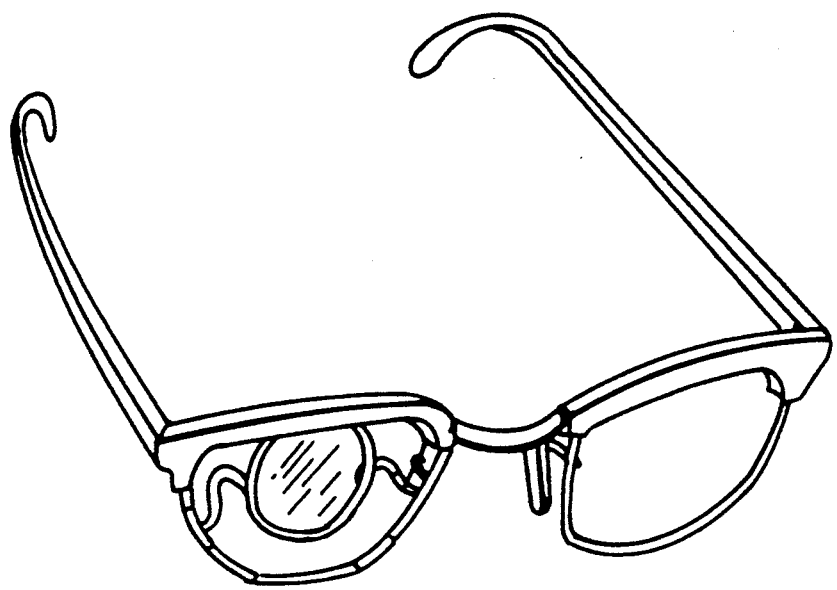
FIG. 1 is an isometric illustration of a prior art magnification lens structure utilized in the spectacle art.

With reference now to the drawings, and in particular to FIGS. 1 to 10 thereof, a new and improved adjustable lens spectacle apparatus embodying the principles and concepts of the present invention and generally designated by the reference numeral 10 will be described.

Figure 2:
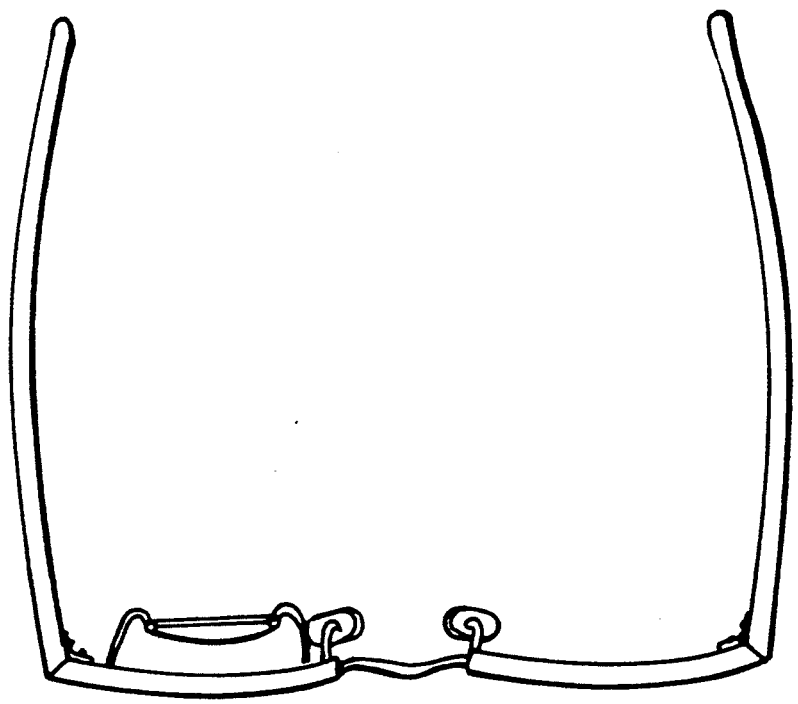
FIG. 2 is an orthographic top view of the lens structure as set forth in FIG. 1 of a prior art spectacle apparatus.
Figure 3:
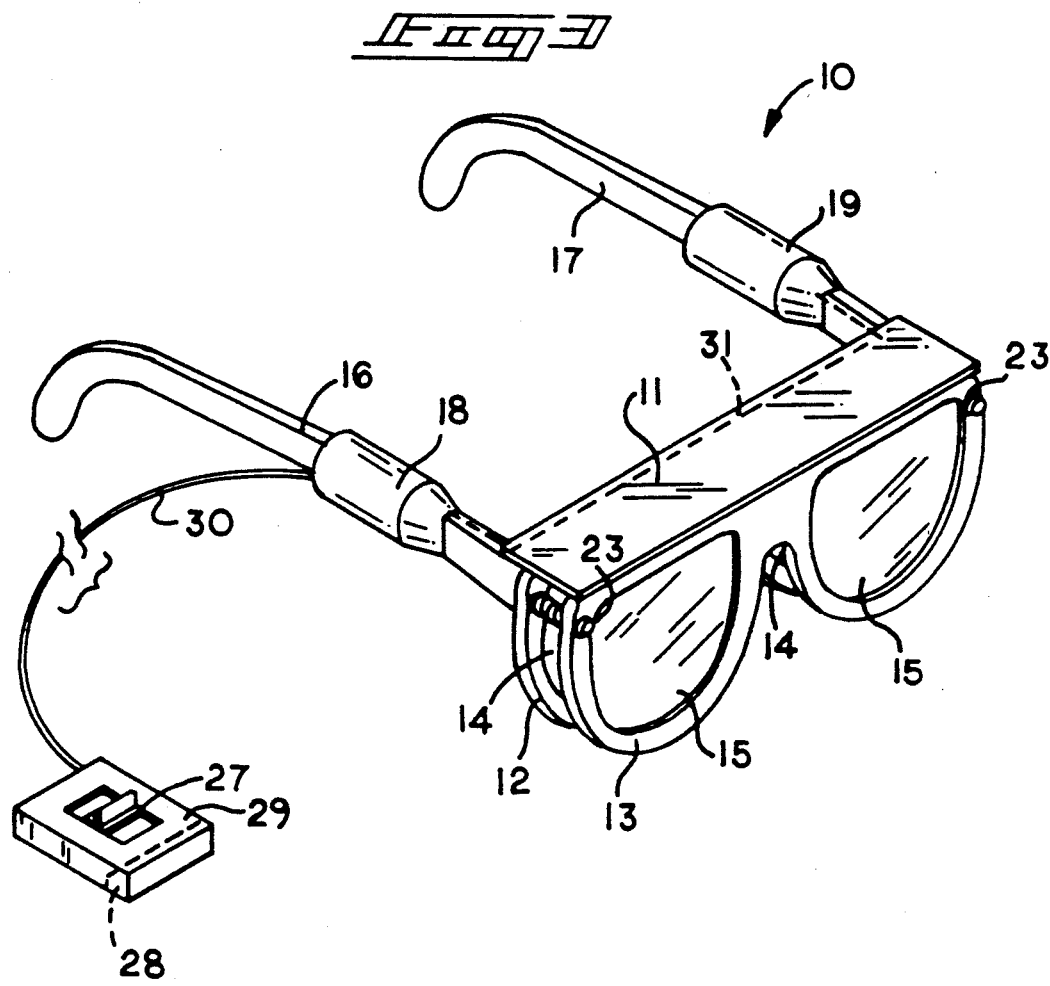
FIG. 3 is an isometric illustration of the instant invention.

The FIGS. 1 and 2 illustrate a typical prior art magnification lens structure as utilized in the spectacle art, as illustrated in U.S. Pat. No. 3,449,043, mounting a lens member rearwardly of one of the spectacle lenses, wherein the rear lens is fixedly mounted to the framework of the spectacle apparatus.

More specifically, the adjustable lens spectacle apparatus 10 of the instant invention essentially comprises a spectacle support frame plate 11 mounting a rear lens frame 12 slidably relative to the frame plate 11, with a forward lens plate 13 fixedly mounted in an orthogonal relationship to a bottom surface of the frame plate 11. The forward lens frame 13 and associated forward lens members 15 are formed of a shape retentent deformable polymeric material. The rear lens frame 12 includes associated rear lens members 14. Accordingly, the rear lens frame 12 includes respective right and left temple legs 16 fixedly mounted to the frame plate 11 in an orthogonal relationship relative to the rear lens frame 12 for mounting the spectacle apparatus to an individual. A respective right and left drive motor housing 18 and 19 mounted to the respective right and left temple legs 16 and 17 each include an associated reversible drive motor 20. Each drive motor 20 and its association with the lens frames 12 and 13 are exemplified in the FIG. 4 and are of an identical construction, whereas the description relative to the right temple leg is equally applicable to the left temple leg 17.

Figure 4:
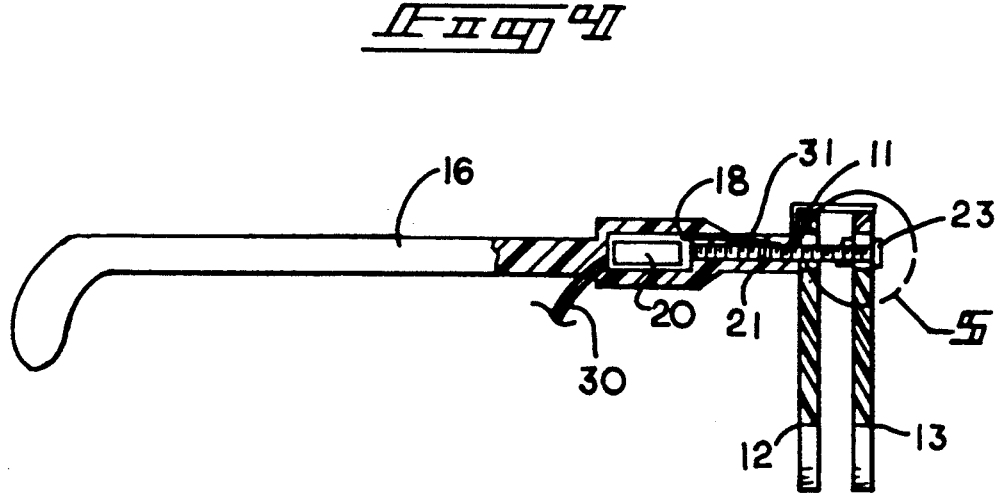
FIG. 4 is an orthographic side view, partially in section, of the invention.
Figure 5:
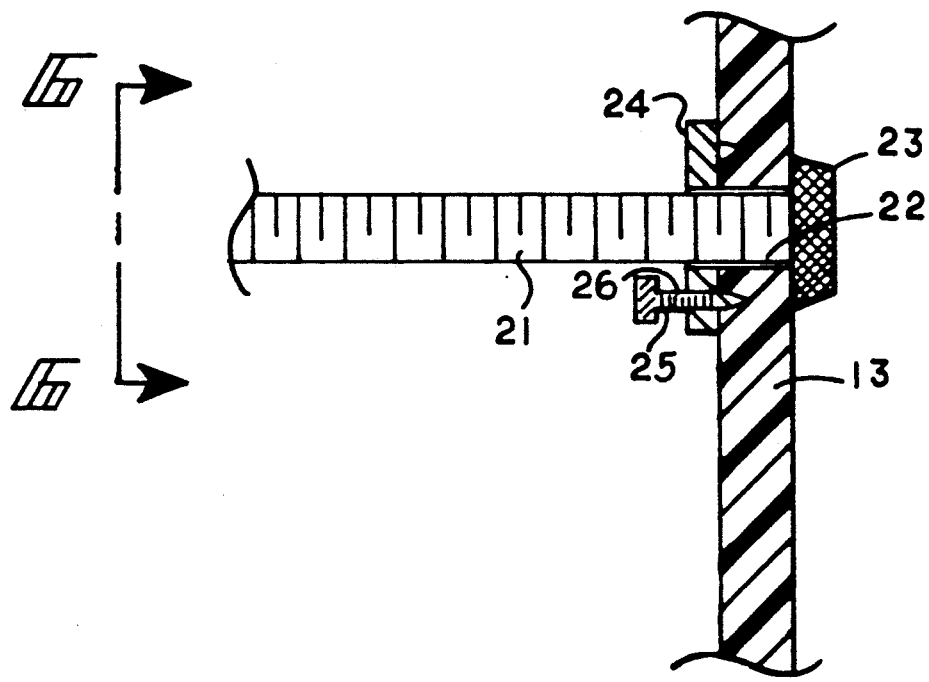
FIG. 5 is an orthographic view of section 5, as set forth in FIG. 4.
Figure 6:
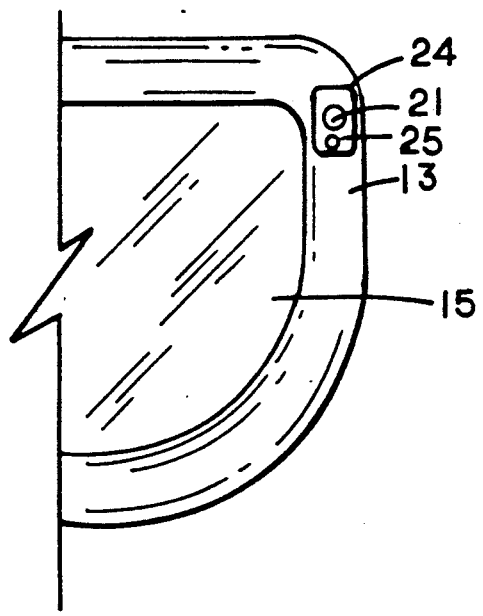
FIG. 6 is an orthographic view, taken along the lines 6—6 of FIG. 5 in the direction indicated by the arrows.

As illustrated in FIG. 4, the right temple leg 16 and the associated drive motor 20 contained within the housing 18 includes an externally threaded drive screw 21 rotatably mounted to the drive motor 20 and is threadedly mounted and directed through the lens frame 12 and rotatably mounted within a receiving bushing 22 (see FIG. 5) of the forward lens frame 13. A drive screw fixing head 23 is mounted to each forward distal end of each drive screw 21 to secure the drive screw relative to the front lens frame. A rigid abutment bushing 24 is mounted to a rear surface of the lens frame 13 and optionally includes an abutment screw 25 mounted rotatably within an abutment screw bore 26 within the bushing plate 24 that is arranged parallel relative to the drive screw 21 to effect abutment with the rear lens frame 12 to control relative spacing between the rear and forward lens frames 12 and 13 respectively controlling a minimal spacing therebetween. A reversing switch 27 in electrical communication with the associated drive motor of each respective right and left drive motor housing 18 and 19 of each respective temple leg through a battery 28 contained within reversing switch housing 29 effects selective reversing of each respective drive motor by reversing electrical polarity of each respective drive motor, and is in communication with the drive motor of the right drive motor housing by a first electrical conduit line 30 that in turn is connected to the drive motor of the left drive motor housing 19 through a second electrical conduit line 31. In this manner, simultaneous actuation of each drive motor of each temple leg is effected to effect selective spacing towards or away from the forward lens frame 13 by the rear slidable lens frame 12.

Figure 9:
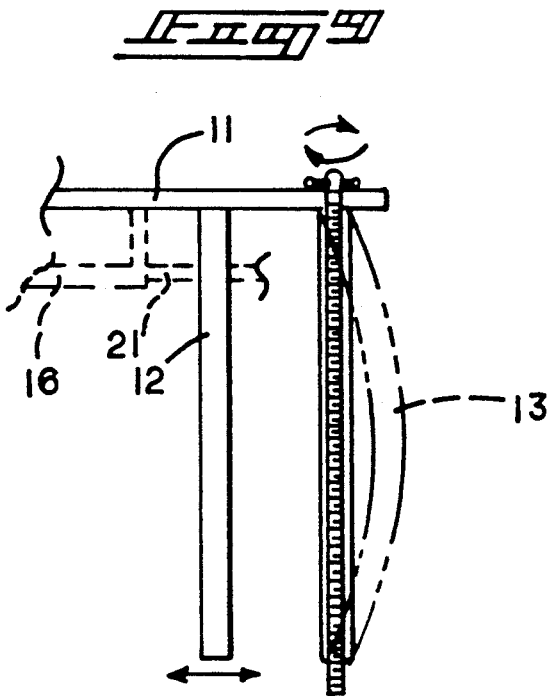
FIG. 9 is an orthographic side view, taken along the lines 9—9 of FIG. 8 in the direction indicated by the arrows.

Reference to FIG. 8 illustrates the use of the invention utilizing a manner of effecting magnification of the forward lens frame 13 by effecting its convex displacement, as illustrated in phantom in FIG. 9. To this end, a right and left clamp screw 32 and 33 directed orthogonally and rotatably through the frame plate 11 extend downwardly along each respective right and left end of the forward lens frame 13 threadedly received within a respective right and left clamp leg 38 and 39 to effect selective projection of the right and left clamp leg 38 and 39 to a bottom edge underlying each respective lens 15 of the forward lens frame 13. A right and left lower clamp foot 36 and 37 are in abutment with a bottom edge of the forward lens frame medially of each respective lens cooperating with a respective right and left upper clamp foot 34 and 35. In this manner, the forward lens frame 13 may be deformed equally relative to each respective right and left lens of the forward lens members 15 by the respective right and left clamp screws 32 and 33 effecting deforming pressure to the forward lens frame 13 and the associated lenses 15. The shape retentive material forming the lenses and frame of the forward lens frame structure permits the organization to return to its original configuration upon release of pressure relative to the forward lens frame and thereby further permit altering for the magnification of the forward lens frame structure.

Figure 10:
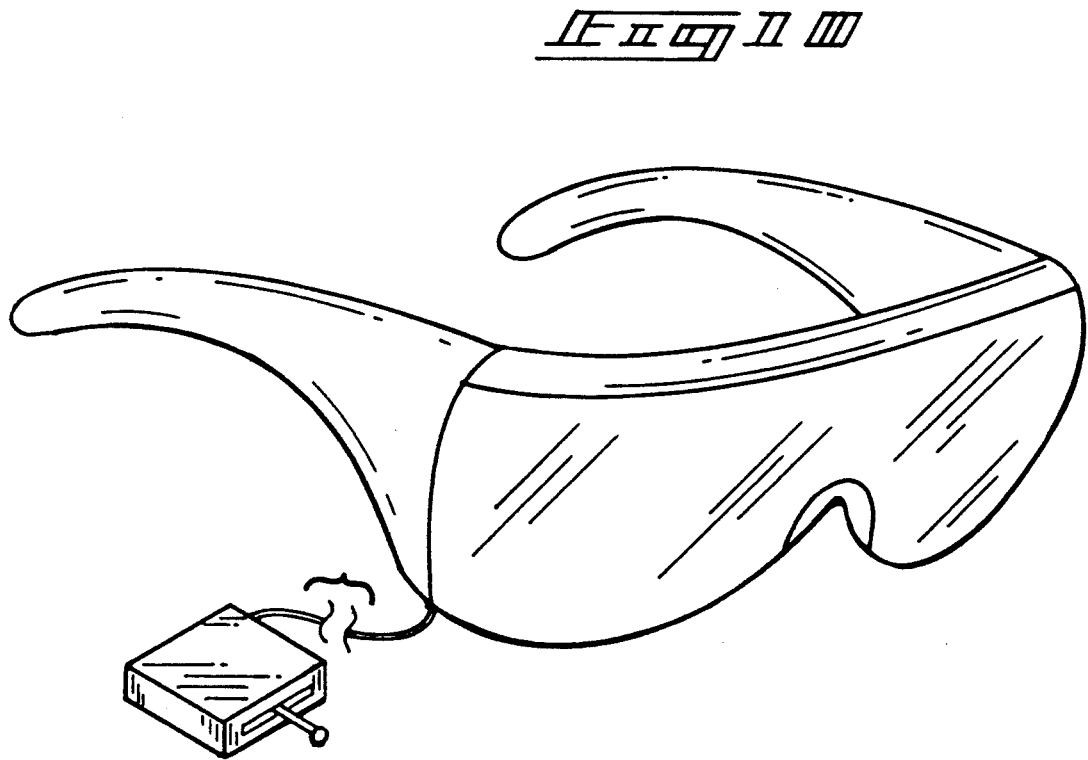
FIG. 10 is an isometric illustration of a modified configuration of the spectacle structure as utilized by the invention.

The FIG. 10 illustrates a housing enclosure that may be utilized by the invention to enclose the organization, as illustrated in the FIGS. 1-9, to provide covering of the organization and its components.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An adjustable lens spectacle apparatus, comprising,
    a rigid spectacle support plate, a forward lens frame fixedly and orthogonally mounted to a bottom surface of the support plate, with a rear lens frame slidably mounted relative to the support plate relative to the bottom surface of the support plate rearwardly of the forward lens frame, and the rear lens frame including a rear lens frame right end and a rear lens frame left end, with a respective right and left temple leg fixedly mounted to the support plate rearwardly of the rear lens frame, with the right temple leg positioned adjacent the rear lens frame right end and the left temple leg mounted adjacent the rear lens frame left end, with the rear lens frame including a right and left rear lens member contained therewithin, and the forward lens frame includes a respective right and left forward lens member contained therewithin, wherein the right rear lens member and the right forward lens member are aligned relative to one another, and the left rear lens member and the left forward lens member are aligned relative to one another, and
    a right drive motor contained within the right temple leg and a left drive motor contained within the left temple leg, and
    right drive means coupling the right drive motor to the rear lens frame and left drive means coupling the left drive motor to the rear lens frame for effecting relative reciprocation of the rear lens frame relative to the forward lens frame.

2. An apparatus as set forth in claim 1 wherein the right drive motor and the left drive motor are each reversible and a reversing switch contained within a reversing switch housing includes a battery to effect selective reversing of the right drive motor and the left drive motor.

3. An apparatus as set forth in claim 2 wherein the right drive means and the left drive means each include an externally threaded drive screw, each drive screw threadedly and orthogonally received through the rear lens frame.

4. An apparatus as set forth in claim 3 wherein each drive screw includes a drive screw head member fixedly mounted to a forward distal end of each drive screw, wherein the head member is mounted to a forward surface of the forward lens frame, and each drive screw includes a drive screw bushing plate fixedly mounted to a rear surface of the forward lens frame, wherein each drive screw is rotatably mounted relative to each head member, and each head member is fixedly mounted to the forward lens frame to rotatably mount each drive screw relative to the forward lens frame.

5. An apparatus as set forth in claim 4 wherein each bushing plate includes an abutment screw, the abutment screw is threadedly received within an abutment screw bore contained within the bushing plate and the abutment screw is arranged parallel relative to each respective drive screw to control a minimum spacing between the rear lens frame relative to the forward lens frame.

6. An apparatus as set forth in claim 5 wherein the forward lens frame includes a forward lens frame right end and a forward lens frame left end, wherein a respective right clamp screw and left clamp screw are orthogonally and rotatably directed through the support plate and project adjacent the respective right and left forward lens frame end, with the right clamp screw including a right clamp leg and the left clamp screw includes a left clamp leg, wherein the right clamp leg and the left clamp leg threadedly receive the respective right and left clamp screw therethrough, and wherein the right clamp leg and the left clamp leg are arranged to clamp the forward lens frame between the right clamp screw, the left clamp screw and the support plate to effect contortion of the forward lens frame and the right and left forward lens members to alter magnification of the forward lens members.

7. An apparatus as set forth in claim 6 including a right upper clamp foot and a left upper clamp foot positioned medially adjacent an upper edge of the respective right and left forward lens members, and the right clamp leg and the left clamp leg include a respective right lower clamp foot and a lower left clamp foot positioned below the respective right and left forward lens members, wherein the right upper clamp foot and the left lower clamp foot are aligned relative to one another and the left upper clamp foot and the left lower clamp foot are aligned relative to one another to impart maximum deflection to the respective right and left forward lens members.

* * * * *